United States Patent [19]
Szatkowski

[11] 3,943,212
[45] Mar. 9, 1976

[54] METHOD FOR SINTER MOLDING PLASTIC ARTICLES

[75] Inventor: Richard R. Szatkowski, Western Springs, Ill.

[73] Assignee: Continental Can Company, Inc., New York, N.Y.

[22] Filed: Feb. 6, 1974

[21] Appl. No.: 440,143

Related U.S. Application Data

[63] Continuation of Ser. No. 821,337, May 2, 1969, abandoned.

[52] U.S. Cl. ................. 264/24; 264/126; 264/309; 264/310
[51] Int. Cl.² .......................................... B06B 1/02
[58] Field of Search ........... 264/126, 302, 309, 310, 264/121, 24

[56] References Cited
UNITED STATES PATENTS

| | | | |
|---|---|---|---|
| 3,301,925 | 1/1967 | Engel | 264/37 |
| 3,660,547 | 5/1972 | Ruekberg | 264/24 |

*Primary Examiner*—Robert F. White
*Assistant Examiner*—J. R. Hall
*Attorney, Agent, or Firm*—Diller, Brown, Ramik & Wight

[57] ABSTRACT

Molding is performed by directing streams of comminuted plastic material against surfaces of a heated form or mold, while repeatedly sweeping the form or mold across the streams, progressively depositing the material in one or more predetermined zones, so that the material assimilates progressively along the form or mold surfaces. Apparatus for so molding large receptacles, such as drum liners, includes a series of open molds supported on a turntable for rotation of the molds about their horizontal axes, with the open ends facing radially outward. The table is indexed relative to the various stations, at which successive steps of preheating, deposition, post-heating, cooling and stripping are performed. The deposition apparatus is on a carriage reciprocable radially of the table. A roll unit and several spray units direct streams of the material against the mold surfaces while the mold is rotated and maintained at a temperature suitable for incipient fusion of all the material substantially instantaneously upon impingement, so that the material adheres and fuses where deposited on the mold surfaces. When deposition is complete the mold passes through an arcuate oven overlying a sector of the table, for final sintering. The mold is then quenched, setting the material, whereafter the finished article is stripped from the mold.

8 Claims, 13 Drawing Figures

Fig. 13.

METHOD FOR SINTER MOLDING PLASTIC ARTICLES

This is a continuation of Ser. No. 821,337, filed May 2, 1969, now abandoned.

BACKGROUND OF THE INVENTION

1. Field of the Invention

The invention pertains to sinter molding of plastic articles, more particularly a method for molding or forming without pressure, as in open molds. The manufacture of self-supporting plastic liners for fiber drums is representative of the uses to which the method of the invention is directed.

2. The Prior Art

It has been proposed to produce plastic articles by sinter molding, as by spraying or scattering material on a heated form or mold. However, the prior methods and apparatus do not achieve consistently uniform results, particularly in forming receptacle walls. Proposed prior methods and apparatus are principally deficient in that they do not provide regular, co-ordinated deposition and fusion for progressive assimilation along the form or mold surface, so that material is erratically distributed, the condition being aggravated by spalling and slumping. The resultant articles are generally characterized by non-homogeneity, voids, thin spots, porosity, poor physical properties, section and thickness irregularity, and like defects. Attempts to overcome these defects by excess charging, centrifuging and similar expedients, have proved ineffective, because they do not mitigate the effects or irregularity to incipient sintering, the material being only moderately fluent when sintered. Further, such expedients prove generally uneconomical, in that a substantial excess of the material must be deposited, involving bulky apparatus, protracted deposition time, and recirculation or reclamation of a large proportion of material which does not assimilate upon initial deposit.

Large receptacles, such as drum liners, have generally been produced by working latex on mandrels, or by vacuum-forming elastomer sheet stock, and then vulcanizing or curing. Such methods have proved costly and not entirely satisfactory. Limitations of material selection, high manufacturing cost and limited adaptability of the process often preclude obtaining the most suitable chemical and physical properties. Considerations of economy in manufacture and installation, and conservation of fill-space in the lined article generally dictate that the liners be only so thick as is necessary for desired protection, on the order of one thirty-second to one-sixteenth inch thick. With prior art materials and manufacturing techniques, large liners having a thickness of the order indicated are generally not self-supporting, are difficult to handle and ship, often do not fit the drum with sufficient accuracy, and are therefore excessively subject to damage in handling, shipment and in use. Losses, delays and high cost are frequently aggravated by the circumstance that specialized sources of liner supply may be remote from the site at which the drums or other finished articles are manufactured.

SUMMARY OF THE INVENTION

It is an object of this invention to provide a method for sinter molding without pressure to produce plastic articles from comminuted material in a satisfactory and economical manner.

It is a further object of this invention to provide a method for manufacturing large receptacles by depositing and sintering comminuted material in open molds, in a manner to assure reproduceably accurate formation of the article to close tolerances, with uniform thickness or section around the article, according to exacting requirements for strength, durability, and imperviousness.

It is a still further object to provide an open-mold sinter molding method for economically mass-producing large thin-walled receptacles having full sections of varying thickness, with a high degree of section uniformity around the circumference.

The foregoing and other obects and advantages of the invention are achieved by means of a novel method particularly adapted to an automatic process by which high production rates can be economically obtained in a relatively compact and closely integrated installation.

To accomplish the foregoing and other objects and advantages, this invention provides a method of sinter molding wherein dense streams of comminuted material are directed into predetermined zones to effect instantaneous impingement on portions of the form or mold surface, while repeatedly sweeping the heated form or mold across the streams in a predetermined path to effect progressive deposition and assimilation along the surface. The deposition rate, temperature and sweep rate are co-ordinated to achieve incipient fusion of all the material virtually instantaneously upon deposit, so that particles of the material adhere and cohere at their respective points of impingement, and assimilation proceeds progressively on and along the surface without dislocation or shift of the material. With provision in the method for coordinating the patterns and rates of several units depositing simultaneously, the invention is well adapted to mass-production of large, thin-walled receptacles, such as drum liners, with wall sections selectively varied to suit particular structural and service requirements, for example with a bottom thicker than the sidewall. After final sintering and cooling, the resultant articles exhibit a high degree of homogeneity, imperviousness, smoothness and regularity of wall section within close tolerances.

In one embodiment of the method invention a heated, open mold of the desired cavity configuration is rotated with its axis horizontal, while comminuted plastic material is deposited along the mold cavity surfaces. The deposition pattern and rate are established for progressively building a deposit of the required thickness during a prescribed number of mold revolutions, the deposition rate corresponding to the rate at which the particles incipiently fuse and coalesce. The rotational speed of the mold is less than that which effects churning. The mold is preheated and then maintained at the optimum temperature for quick fusion of the material. Deposition is performed by means of a downwardly directed stream from a roll unit and streams from spray units, the units being selected and arranged according to the size and configuration of the article. Electrostatic charges are applied to some of the material, such as portions deposited on walls in vertical planes, to supplement the fusion adherence effects, thereby assuring controlled distribution and build-up and minimizing losses or dislocation by slump or fall-off. Sintering is completed by passing the mold through an oven, whereafter the mold is cooled to set the material and the article is stripped from the mold.

For automated production, the apparatus components are arranged upon and around a turret or turntable, which is indexed to move each mold from station to station. The station operations are so timed and implemented that a given dwell period is suitable for the optimum performance of each operation, thus minimizing idle-station time.

The molds are supported on rollers, each mold being coupled to a motor. The molds rotate continuously throughout the cycle except when stopped to remove the articles. A control system is provided for fully automatic production, the only manual work being that of stripping the article. The controls may be switched over to semi-automatic or manual operation for set-up, checking and adjustment.

Sectional, strip burners at the preheat and deposition stations are zone-controlled by pyrometers to insure uniform heating. The deposition unit is mounted on a reciprocable carriage, which moves into and out of the mold radially of the turntable. The arcuate oven encompasses a segment of the table, constituting three post-heating stations in the cycle. The lower portion of the inner oven wall is formed by wall sections carried on the table around its entire circumference inwardly of the molds, maintaining continuous oven sidewall closure, while accommodating the mold drive shaft. A waterfall jet sprinkler at the cooling station quenches the mold preparatory to stripping the article.

The foregoing and other objects, advantages, and details of the invention are explained more fully in the ensuing description and the accompanying drawings.

DESCRIPTION OF THE PREFERRED EMBODIMENT

Figures 1, 2:
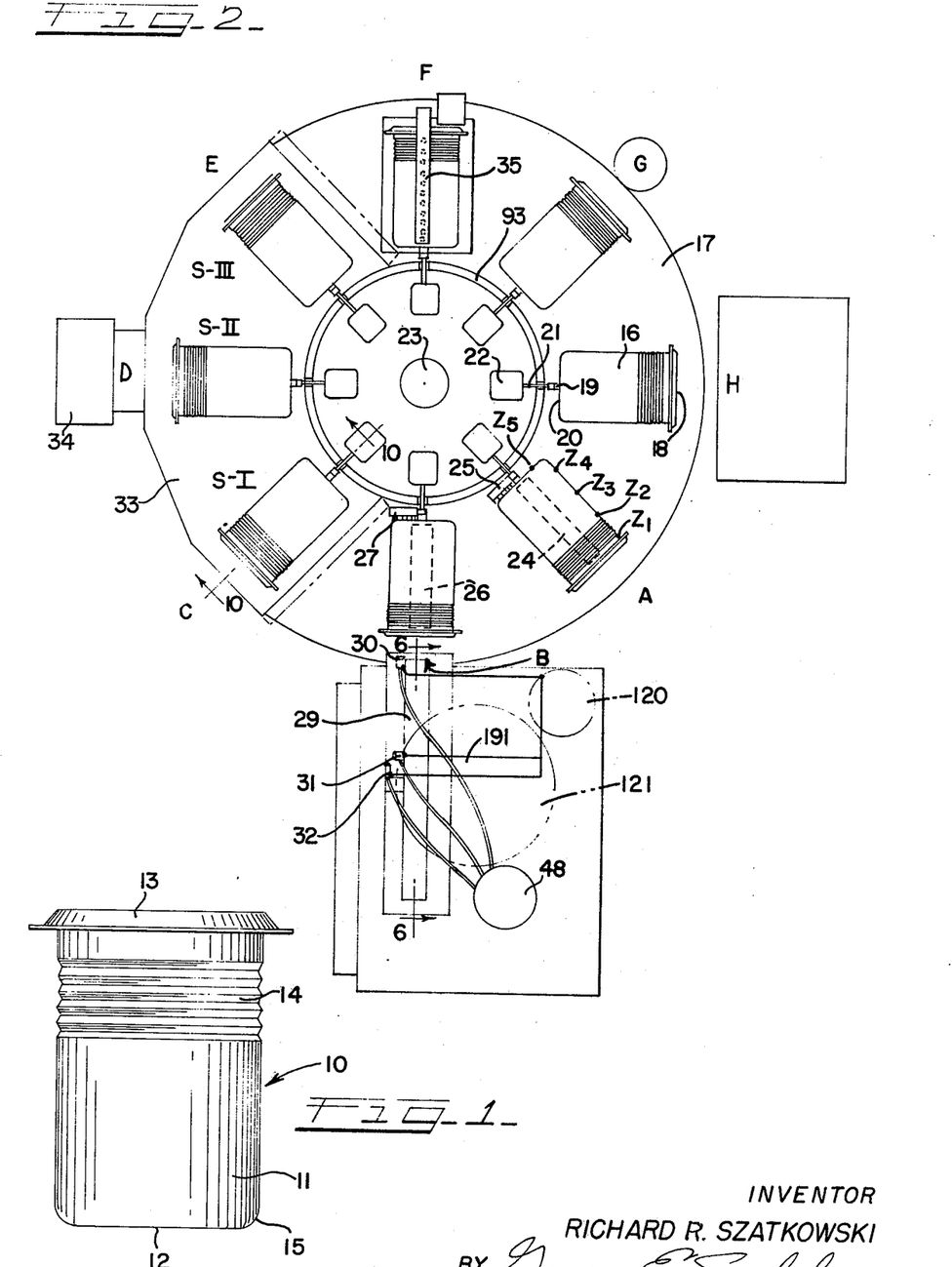
FIG. 1 is an elevation of a drum liner, representative of articles which can be produced with the method and apparatus of this invention.
FIG. 2 is a schematic plan view of apparatus for sinter molding articles according to this invention.

The article shown in FIG. 1 is representative of products for which the method of this invention is particularly intended. The article here shown is a drum liner 10, of a style used in fiber drums intended for storage and transportation of chemicals and other materials which may attack or permeate the paperboard or similar materials of which such drums are usually made. Similar liners for metal drums, and articles such as tanks, vats, pails and other receptacles, are also contemplated within the scope of articles which can be manufactured according to this invention. The invention is also adaptable to in situ lining of pipes, tanks and other vessels or receptacles.

Liner 10 comprises a generally cylindrical or tubular side wall 11, a bottom end wall 12, and a peripheral chime 13. The configuration is designed for close conformity to all interiorly exposed surfaces of the drum to which liner 10 is to be applied, the liner chime 13 being engaged and sealed by the drum lid. Wall corrugations 14 provide sidewall extension to safely accommodate shock loads and weight of fill.

The configuration of the liner 10 presents a difficult problem of manufacture, considering the size and proportions usually involved. Representative dimensions of liner 10 are 2½ feet diameter × 3½ feet long. A representative basic body wall thickness is on the order of one thirty-second inch. Considerations of handling, transportation, installation and use of the liner 10 may require a variation in wall thickness from that maintained in the body 11. For example, it is desirable to hold a thickness of as much as one sixty-fourth inch greater at the bottom radius 15 and in the corrugations 14, to strengthen those areas, while maintaining the thickness somewhat less than the basic value in the region of the chime 13, for the sake of desirable flexibility and seal characteristics. Thus, production of articles such as the drum liner 10 involves precision forming of a varying, thin wall.

The general layout of preferred apparatus for practicing the method of this invention is shown in FIG. 2. The apparatus here shown is that preferred for high-volume production, although it will be understood that the method may be practiced with other arrangements of apparatus for low or medium volume production, according to economic considerations involved with a particular article and its production requirements. In outline, the steps consist of material deposition, sintering, cooling, and stripping.

In the apparatus shown in FIG. 2, molds 16 are equally spaced around a table 17. The molds 16 are essentially replicas of the drums for which liners 10, FIG. 1, are intended. The molds are designed to suit the mechanical requirements of the operation, the cavities being dimensioned with due allowance for the shrinkage characteristic of the particular material to be molded. Molds 16 rest on table 17 with their axes horizontal, radially of table 17, with open ends 18 facing out. The molds are supported for rotation about their axes, a preferred support being subsequently shown and described herein. Hubs 19 are fixed to the mold bottoms 20, with a drive 21 coupling each mold 16 to a motor 22, which is affixed to table 17.

Table 17 is supported on a column 23, about which the table is indexed to present each mold 16 in succession at each of eight stations, lettered A–H. Table 17 dwells after each index, with a mold at each station. The cycle program is as follows:

| STATION | OPERATION |
| --- | --- |
| A | Preheat Mold |
| B | Deposit Material, Pre-Sinter |
| C | Sinter I ⎫ |
| D | Sinter II ⎬ Post-Heat Mold |
| E | Sinter III ⎭ |
| F | Quench |
| G | Strip Article From Mold |
| H | Idle |

In the illustrative example, the station arrangement and cycle timing are selected for operation balance with seven operating stations. Idle station H is provided for the purpose of changing and servicing molds and appurtenant apparatus, the molds being there clear of operating station apparatus and thus more accessible. When it is desired to change molds for producing an article of different size or type, table 17 need merely be indexed under manual control to bring each mold placement successively to station H and dwell there for the time sufficient to make the change. Similar procedure may be followed for repairs, reconditioning, or other service on the mold assembly. The eighth station and corresponding additional mold assembly also afford symmetry and mechanical balance of the entire table assembly.

GENERAL METHOD AND MACHINE

It should be understood that particular values or parameters of operating conditions are those obtaining with the exemplary article of FIG. 1 and apparatus of FIG. 2, by way of illustration, not as limitations. It will be obvious in the course of the description that other values or parameters may obtain with articles of different types or sizes and other arrangements of apparatus to which the method of this invention is adaptable.

Referring again to FIG. 2 and the operations chart given above, the method will be described as practiced for producing the drum liner shown in FIG. 1 according to the operations scheme shown in FIG. 2. A representative suitable material is powdered polyethylene, such as type MN703, MN739X, or a blend thereof, as manufactured by U.S. Industries, Inc. Other sinterable plastic materials can be used, according to the dimension and physical properties of the article to be produced.

During operations at stations from A to F inclusive, mold 16 is revolving on its axis at 18 rpm. At station A the mold is preheated to a temperature of about 180° F., somewhat below the fusion temperature of the raw powder. With the mold 16 revolving, quick, even heating is achieved by using gas-fired strip burners 24 and 25, the former extending radially of the table in a plane just below the plane of the table and the latter being positioned immediately behind the mold and extending radially thereof.

As hereafter shown, table 17 is of skeletal construction, exposing mold 16 directly to the flame of burner 24. Burner 25 may be suspended, with its piping and controls thus clear of the table assembly. In order to insure uniform heating throughout the length of mold 16, burners 24 and 25 are preferably sectional, with zone control, the zones being Z-1, 2, 3, 4, 5, at the chime, front, center, back, and bottom of the mold respectively. The burner section corresponding to each zone is individually controlled by an optical pyrometer (not shown) sighting a selected zone, constituting a burner control system, well known in the heating art, which need not be described in greater detail here. Zones Z-1, 2, 3, 4 are heated by corresponding sections of burner 24 and zone Z-5 is heated by burner 25.

Deposition station B is provided with burners 26 and 27, which are similar to burners 24 and 25 respectively, and similarly controlled. Burners 26 and 27 bring the mold to a body temperature of 400° F., to rapidly fuse the finely divided polyethylene powder, which is deposited in the mold by the reciprocable deposition assembly 28. Assembly 28 comprises a roll deposition unit 29, and three fluidized powder spray deposition units 30, 31 and 32, the entire assembly being reciprocable into and away from mold 16. With the deposition assembly 28 in the mold the several deposition units are in proximity to the areas on which they respectively deposit. Unit 29 deposits a strip of powder along the side wall of the mold, while units 30, 31 and 32 spray the bottom, inside chime, and outside chime respectively. The powder incipiently sinters virtually instantaneously on or just before impingement, particles adhering where deposited. Adherence of the sprayed particles is aided by electrostatically charging the particles. The deposition step and apparatus are described in further detail hereafter.

From station B, mold 16 advances through three post-heat sintering stages, S-I, II, III, corresponding to stations C, D, E, which are constituted in an arcuate oven 33. The oven atmosphere is maintained at the sintering temperature by means of an air heating and distribution system 34. In the sintering stages, curing uniformity is greatly enhanced by virtue of molds continuously rotating as they pass through the oven 33, providing uniform exposure to the atmosphere and high rate of heat transfer. When the mold leaves station E, the article is fully sintered and cured, whereafter it is cooled by means of a sprinkler bank 35 at station F. The article is stripped from the mold at station G, at which station motor 22 is cut out, the mold being stationary during the stripping operation.

As thus implemented, the novel method is adapted to continuous production with automatic control. From the time the first mold of a run leaves station G, production proceeds at a rate of one article for each index and dwell period. With indexing table production, the production rate depends primarily on the dwell time for the station performing the longest operation. The method of this invention is particularly characterized in that is can be successfully practiced in an operation sequence which is readily divided into steps of virtually equal duration, without undue elaboration of the apparatus used or sacrifice in the quality of the article. By way of example, it has been found that the complete deposition at station B can be effected in about 1 minute. Since the deposition step is generally the most critical one, primarily determining the timing of the other steps, the apparatus above described is designed and arranged for timing throughout on the basis of the deposition time of about 1 minute. Thus, production rate is substantially one each minute. It has been found that proper final sintering requires about three minutes; hence, three stations, C, D, and E, have been allocated to this operation.

The apparatus of FIG. 2 is designed for considerable flexibility. That is, the speeds or rates of the various components determining the timing of the several operations are readily variable to accommodate a substantial range in size and type of article produced. Motors 22 may be of the multi-speed or variable-speed type. The sectionalized gas burners at stations A and B are readily adaptable to substantial variation in heating rates, while the zone control provides a variation in the heating distribution pattern, as desirable for articles of various dimensions. Deposition units 29, 30, 31 and 32 as hereinafter described, are adjustable over a substantial range, for varying the deposition rate and distribution pattern. The gas-fired atmospheric oven 33 is suitably equipped and controlled for operation at any selected atmosphere temperature within a substantial range, to accommodate molding materials of various sintering characteristics. The cooling rate at station F can readily be adjusted or varied merely by varying the water supply rate.

DEPOSITION AND PRE-SINTERING

Figures 3, 4:
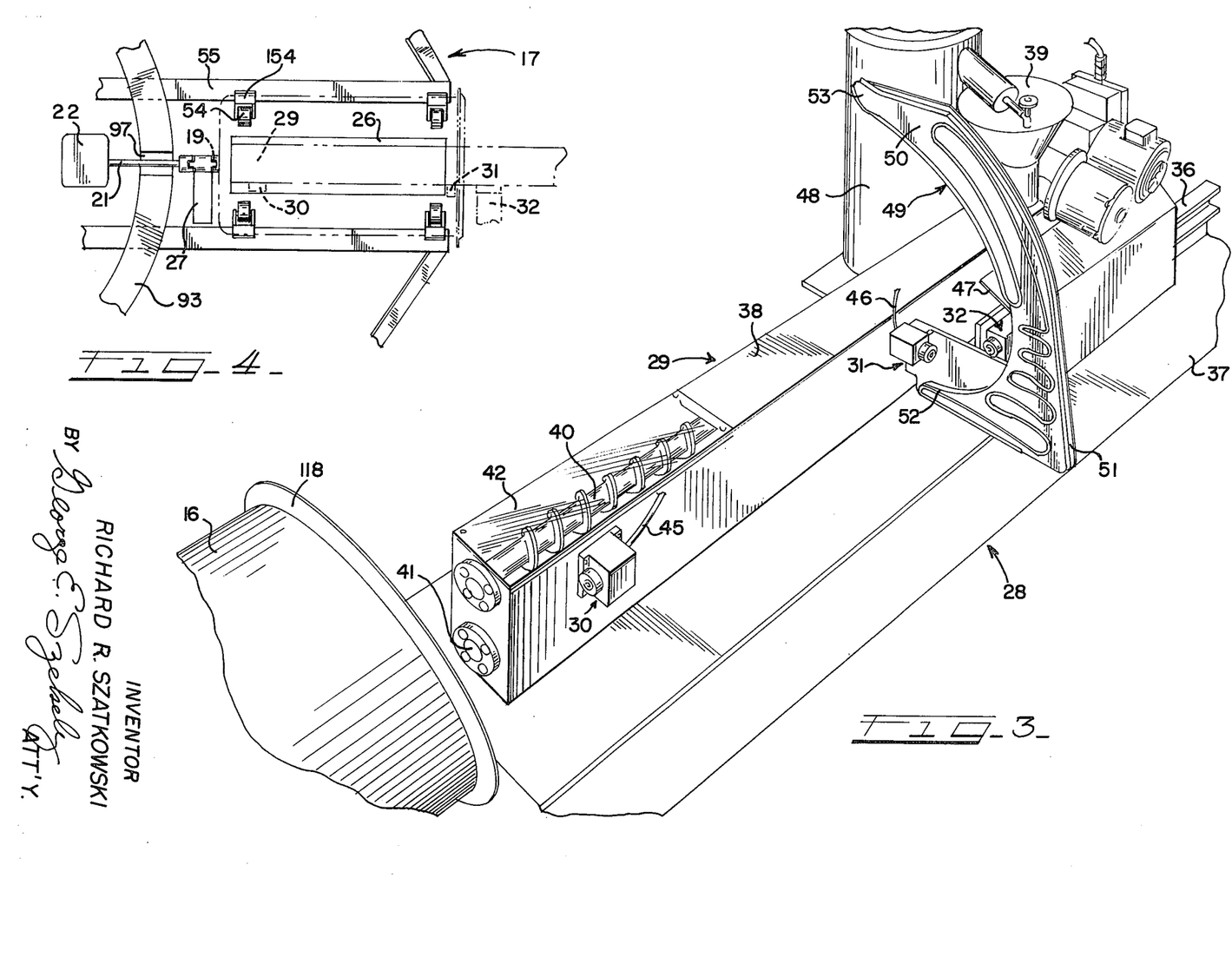
FIG. 3 is a perspective view of the deposition station, as seen looking generally outwardly from the mold table.
FIG. 4 is an enlarged fragmentary plan view of one sector of the table shown in FIG. 2, showing details of the mold support.

FIG. 3 shows the general arrangement of the deposition assembly 28, at station B of FIG. 2, the view being taken in perspective looking outwardly from mold 16, dwelling at station B. In this position, a vertical plane through the axis of mold 16 constitutes the center plane of the deposition unit 29. Assembly 28 is here shown in its retracted position.

Assembly 28 constitutes a carriage arranged to reciprocate axially of mold 16 and slides on rail 36, which rests on a pedestal 37. Unit 29 includes apparatus for depositing powder in a strip or band, axially along the wall inside mole 16, and includes an elongated rectangular case 38, which is supplied with plastic powder through a funnel 39 at the end or case 38 remote from mold 16. Any suitable type of hopper 121, FIG. 2, with a metering gate, may be arranged overhead to register with funnel 39, when in the retracted position shown, whereby a measured charge of powder is dispensed into case 38 at each retraction, corresponding to the deposit requirement of a single mole 16.

Case 38 houses an auger 40 and metering deposition roll 41, immediately beneath auger 40. A window 42, of transparent plastic, is provided for the purpose of inspection from time to time. Motors 43 and 44 carried on the back end of case 38 drive the auger 40 and roll 41 respectively.

Assembly 28 also carries with it supplementary powder deposition means comprising spray deposition units 30, 31 and 32, which are supplied through tubes 45, 46, and 47 respectively, from a fluidized powder supply unit fluidizer 48.

An exhaust hood or catcher 49 is also carried with the assembly 28, catcher 49 being positioned partially to surround mold chime 118, to collect such powder as may escape during spraying deposition from the units 31 and 32, which are arranged to discharge in the vicinity of the catcher 49. The catcher 49 in this case is of the shallow, slot type, formed of complementary plate coils 50, spaced by separator member 51, to define an exhaust slot 52. The sinuous coil portions (unnumbered in FIG. 3) are supplied with cooling water, the cooling effect minimizing the hazard of the captured hot powder adhering or clumping inside the catcher 49, which itself may otherwise become heated to a powder-adherent temperature by its repeated exposure to heat radiating from mold 16, when the assembly 28 is in deposit position, as in FIG. 5. The catcher 49 is connected to a suitable exhaust ventilation system (not shown), by means of an exhaust duct or pipe 53, maintaining a vacuum at the slot 52. The exhaust system preferably includes a dust collector for the separation and retrieval of the powder, as well known in the exhaust ventilation art.

As best seen in FIG. 4, mold 16 is cradled on rollers 54 between arms 55, forming part of the spider framework constituting the outer annulus of table 17. Rollers 54 are carried on the brackets 154. Mold 16 is nested between the arms 55 for close positioning over burner 26, with hub 19 aligned for direct coupling to motor 22.

Figure 5:
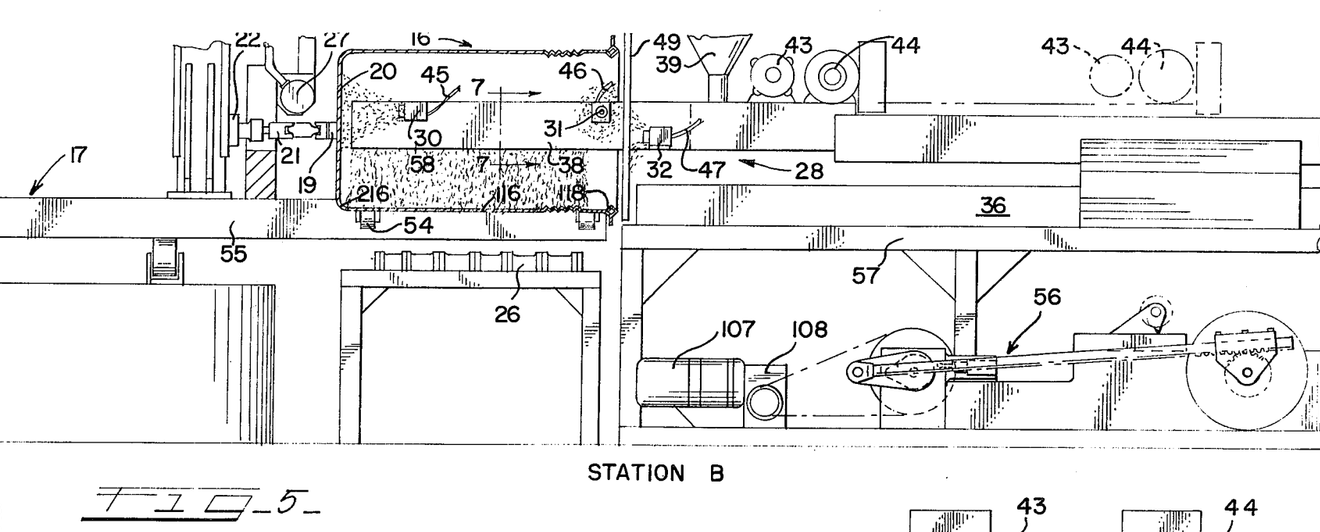
FIG. 5 is a side elevation of the deposition station with the deposition carriage forward, the mold being in section radially of the table, to show relationship of the mold, table and deposition apparatus during deposition.

The relationship between the deposition carriage assembly 28 and the mold at station B, during deposition, is best seen in FIG. 5. Assembly 28 projects into mold 16 generally along the mold axis, mold 16 thus revolving around roller case 38, and may be reciprocated by any suitable rapid traverse reciprocation mechanism, which is generally indicated by the reference numeral 56, the slide rail 36 being supported on a platform 57 at the height required for proper alignment with mold 16. With assembly 28 in the full forward position shown, the discharge opening 58 of case 38 extends along and above the lowermost sector of the mold wall 116 to a terminus opposite radius 216. The spray deposition unit 30 faces inwardly a short distance from mold bottom 20. Spray deposition unit 31 is radially opposed to the mold area at the connection of wall 116 to chime 118. Spray deposition unit 32 opposes the outer area of chime 118, and catcher 49 is immediately outward of chime 118.

Figure 6:
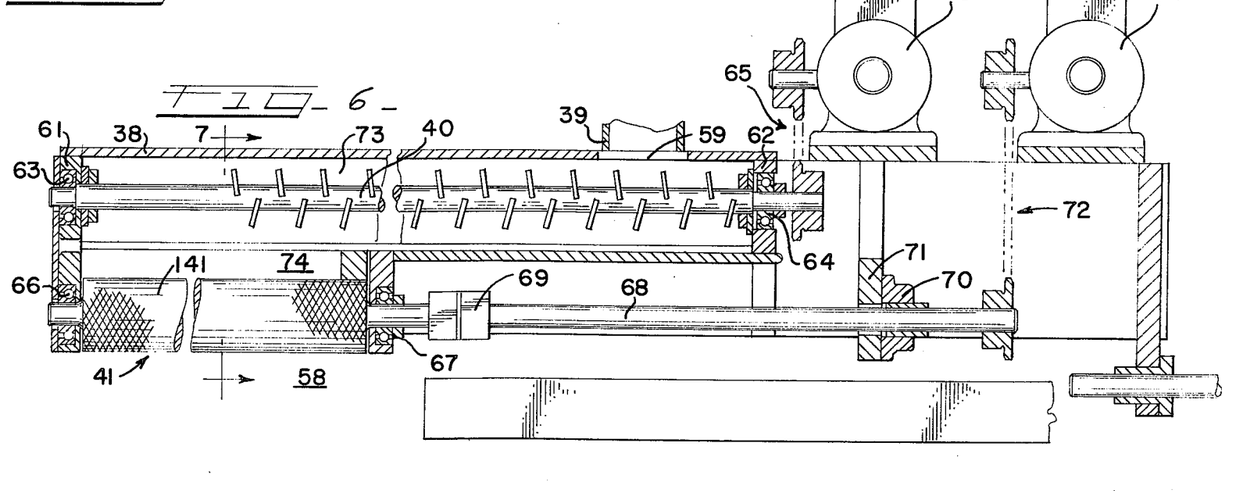
FIG. 6 is a foreshortened section through a portion of the deposition equipment carriage, taken on line 6—6 of FIG. 2, showing the arrangement of the sifting apparatus.
Figures 7, 8, 11:
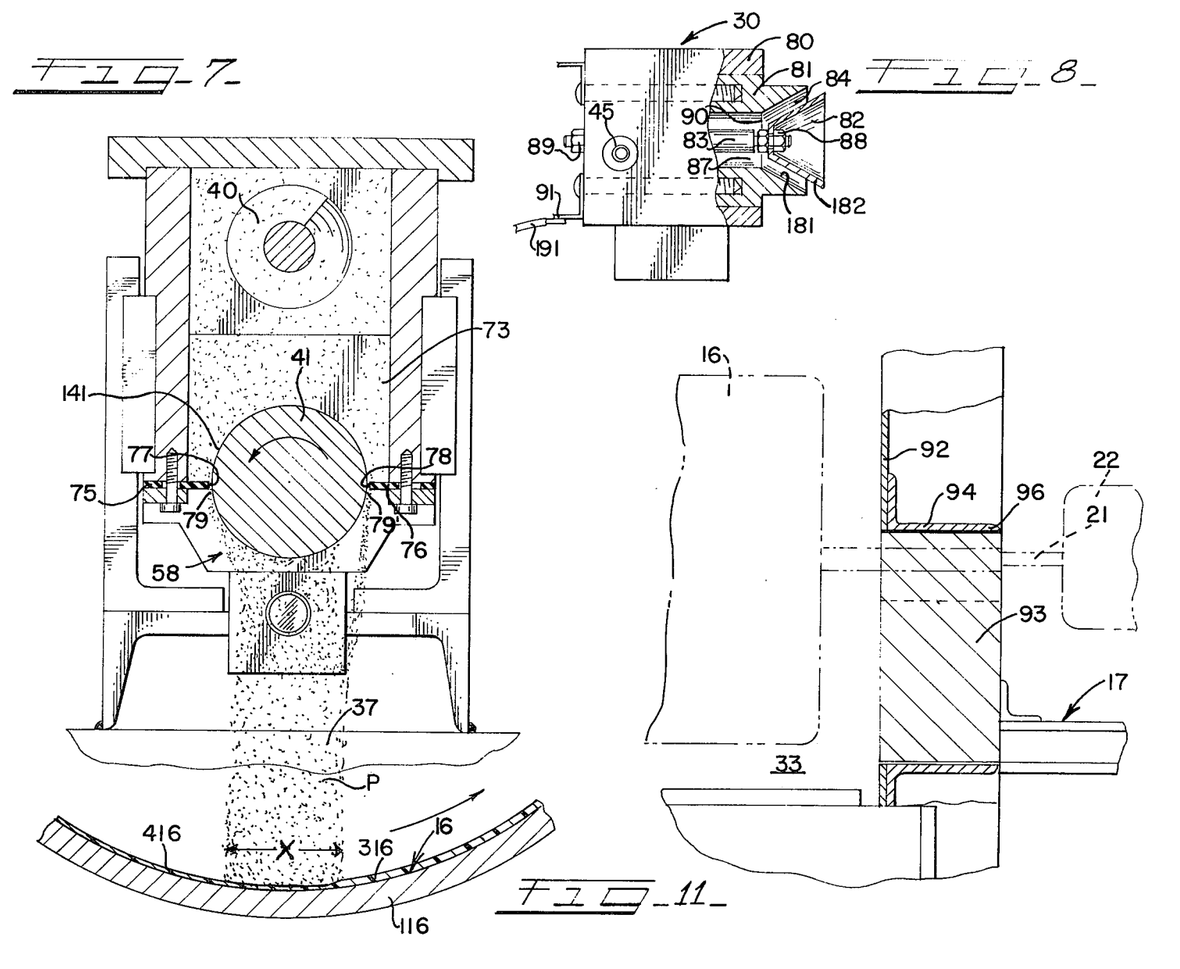
FIG. 7 is a transverse section through the sifting deposition unit, taken on line 7—7 of FIG. 5.
FIG. 8 is a plan view, partly broken away, showing construction of a spray nozzle.
FIG. 11 is a fragmentary section through the table side of the oven, showing the arrangement for movable closing sectors and the table.

Further details of the strip deposition apparatus are shown in FIGS. 6 and 7. The principal operating elements are the auger 40, which feeds the powder coming through the inlet opening 59 from the funnel 39, and the metering roll 41, which discharges a stream of powder through the discharge opening 58.

Auger 40 is supported on end panels 61 and 62 by means of bearings 63 and 64. Variable drive unit 43 drives auger 40 by means of chain drive generally indicated by reference numeral 65. Roll 41 is supported on end panels 61 and 62 by means of bearings 66 and 67 and is connected to drive shaft extension 68 by a shaft coupling 69. Outboard support for drive shaft 68 is provided by bearing 70 on bracket 71. Variable drive unit 44 drives shaft 68 and roll 41 by means of a chain drive generally indicated by reference numeral 72.

Powder delivered to the feed chamber 73 through the inlet 59 is propelled by auger 40 forwardly (left in FIG. 6) toward roll chamber 74, into which the powder drops upon the knurled roll surface 141. Surface 141 captures a film of powder which moves rotarily with roll 41. Pressure exerted by auger 40 maintains the fill of chamber 74 for the full length of roll 41 during delivery and forces the powder onto surfaces 141. The powder blanket around roll 41 is agitated by the action of auger 40.

Referring particularly to FIG. 7, the powder blanket overlying roll 41 is restrained against falloff by a pair of blades 75 and 76, extending the full length of chamber 74, with the blade edges, 77 and 78 respectively, in close proximity to roll 41. The surface 141 of the rotating roll 41 carries the film of powder pressed upon it by the weight of powder above in the direction of rotation, counterclockwise in FIG. 7. The propulsion of this moving film and weight of powder in chamber 74 cause the powder to move at a predetermined rate in a downwardly directed stream through the slit aperture 79, between edge 77 of blade 75 and roll surface 141 of roll 41. By virtue of roll propulsion, the particle velocity is substantially greater than that due to gravity alone, providing a controlled directional effect substantially overriding windage effects. Blade 75 is adjustable relative to roll surface 141, to vary the aperture 79, thus adjustably metering the powder which will pass through slit 79 at any given speed of roll 41.

Blade 76 doctors roll surface 141 to minimize powder carryback and to insure that the powder measure passing the metering slot 77 enters the stream passing through the discharge 58. For this purpose, blade 76 is provided with knife edge 78 and blade 76 is adjusted to a very small clearance at slit aperture 79' between edge 78 and roll surface 141.

In the typical example of forming a liner wall 30 inches in diameter and one thirty-second inch thick, the roll apparatus described is adjusted and operated to deliver 0.93 density finely divided polyethylene in a dense stream at a rate of 0.095 lbs./min./inch roll length. The measured stream of powder P impinges on mold 16 throughout a strip zone which is coextensive with the effective length of roll 41 and of small angular extent X, about 8°, corresponding to about 2 inches arc along the mold surface. With mold 16 rotating at 18 RPM and maintained at 400° F. the particles in the stream, which incipiently sinter at or just before impingement, incipiently coalesce and assimilate virtually instantaneously upon deposit. Thus, deposition and assimilation proceed progressively at corresponding rates along the mold surface, with the material adhering and cohering substantially without dislodgement from respective points of particle impingement along the mold surface. Uniform incidence of fusion and assimilation in the deposition zone are fostered by burner 26 (FIG. 2) applying heat directly to mold 16 in a strip zone generally coextensive with the deposition zone along the periphery of the mold over a width X, as shown in FIG. 7, and lengthwise of mold 16.

The transverse surfaces of substantial extent, such as the bottom 20 and outer surface of chime 118, do not readily admit of desposition by the roll-type deposition assembly 29. However, such transverse areas are treated in a corresponding manner, progressively building the article wall as the mold rotates. For the illustrative example here given, the material is most effectively deposited by spraying streams of powder, the powder being fluidized in well known manner for this purpose.

As previously noted with reference to FIG. 3, in this case three spray deposition units 30, 31, and 32 are sufficient to build up those areas which are not covered by the strip deposition unit 29. The units 30, 31, and 32 are mounted upon and carried with case 38 in position for the powder sprayed from the units to reach and deposit in the zones respectively allocated to each unit. With mold 16, cone pattern spray units are preferred. Such units are readily adjustable as to pattern, quantity, and range for the particular application. However, article sections of other configuration or proportions can be molded by use of spray heads providing flat, fan, or other configuration in one or more zones, as zone extent and distance from the corresponding deposition unit may require.

FIG. 8 shows the details of spray deposition unit 30, which is representative of the three units 30, 31, and 32 required in this instance. Unit 30 comprises a case 80, core 81 and a cone head 82. Core 81 has a bore 87 which communicates with the supply tube 45 leading from the fluidizer 48. The powder supply is under suitable pressure to deliver fluidized powder to head 82 at the desired rate. The discharge rate for given supply pressure is established by setting the cone orifice 84, defined by the cone head surface 182 and the discharge cone surfaces 181 of core 81. This adjustment is made by means of shim 88 and nuts on the threaded stem 83 which is affixed to the core 81 by nut 89 at the back of case 80. Stem 83 is centered in bore 87 by spider 90.

Since mold bottom 20 (FIG. 5) is in a vertical plane, velocity alone will generally not insure that all the powder particles impinge and adhere in intended distribution pattern throughout the target zone. Gravitational and windage effects on the powder stream trajectory may cause departures of certain particles of groups thereof, from the deposit pattern theoretically determined by the direction of the spray from unit 30. Accordingly, provision is made for electrostatically charging the sprayed powder, to establish an attractive force between the mold material and the powder, whereby the particles continue along their directed paths as they approach the mold surface, and are then retained on the surface at the points of respective impingement. Such provision follows the general principles employed in electrostatic spray coating techniques. In this case, the powder particles are most conveniently and effectively charged as they flow through the narrow discharge passage 84, the cone head 82 and core 81 being made of aluminum or other suitable conductive material to serve as electrodes. Core 81 serves as a conductor, and is connected to terminal 91 at the back end of unit 30. Terminal lead 191 is connected to a high voltage generator 120 (FIG. 2). Voltages on the order of 10 to 50 KV and up have been found effective. When electrostatic charging is employed, case 80 is made of material having high insulating properties and suitable mechanical strength, such as phenolic resin, for example.

The constuction of spray unit 31 and 32 is similar to that described for unit 30, except that cone angle and orifice size are in each case those best suited to the area and range of deposition involved, at the particular surfaces to which the powder is directed in each location. Since the chime areas serviced by units 31 and 32 are relatively narrow annuli, steeper cones and smaller orifices are employed than is the case with cone 82 of unit 30.

Referring again to FIGS. 4 and 5, spray unit 30 is focussed to deposit powder in a spot zone which spans the bottom 20 from its center to the corner 216. At its radially outermost extent the spray from unit 30 blends with the deposit of powder along wall 116 from unit 29. As the rotating bottom 20 makes repeated sweeps across the impinging stream from unit 30, the stream progressively deposits material along the entire surface of bottom 20 and radius 216. Similar deposits are effected in bands along the inner chime area by a stream from unit 31 and along the outer area of chime 118 by a stream from unit 32, the deposit from unit 31 blending with the outer marginal deposit from the unit 29 along the juncture of the inner chime area with wall 116. Since the deposition rates and periods of the several units 29, 30, 31, and 32 are independently variable, a corresponding variation in the completed thickness in the several areas served can be achieved in a predetermined total deposition time.

Fine control of the spray deposition is facilitated by providing regulating valves (not shown) in the lines 45, 46, and 47, whereby the amount of powder passing through each of the spray units in a prescribed time can be separately regulated without adjustment at the spray heads. In such case the peak pressure of the fluidizer 48 is selected at a level representing the maximum required for any set-up with which the apparatus is to be used. The pattern and range of the spray units are adjusted to provide for sufficient overlap of contiguous deposit bands to compensate for marginal attribution, thereny minimizing necking or voids, without excessive build-up. Wherever a change in thickness is prescribed, the overlap provides a smooth blend from one thickness to the other.

On termination of deposition, the flow of fluidized powder is cut off from the units 30, 31 and 32. When the flow is cut off, some of the powder in transit through the supply lines and the spray unit settles out. Unless the lines are cleaned after each deposition, powder deposits may build up by settlement, adhesion and trapping in the lines, fittings, and units. Also, that amount of metered powder which does not reach the sprays represents a deficiency in the spray deposition. Therefore, a purging system is provided which will remove substantially all settled powder from the lines and units at the end of each deposition to preclude build-up and flow restriction, as well as to insure delivering the full measure of powder for each deposition. A purging system accomplishing these purposes is shown schematically in FIG. 9.

Figure 9:
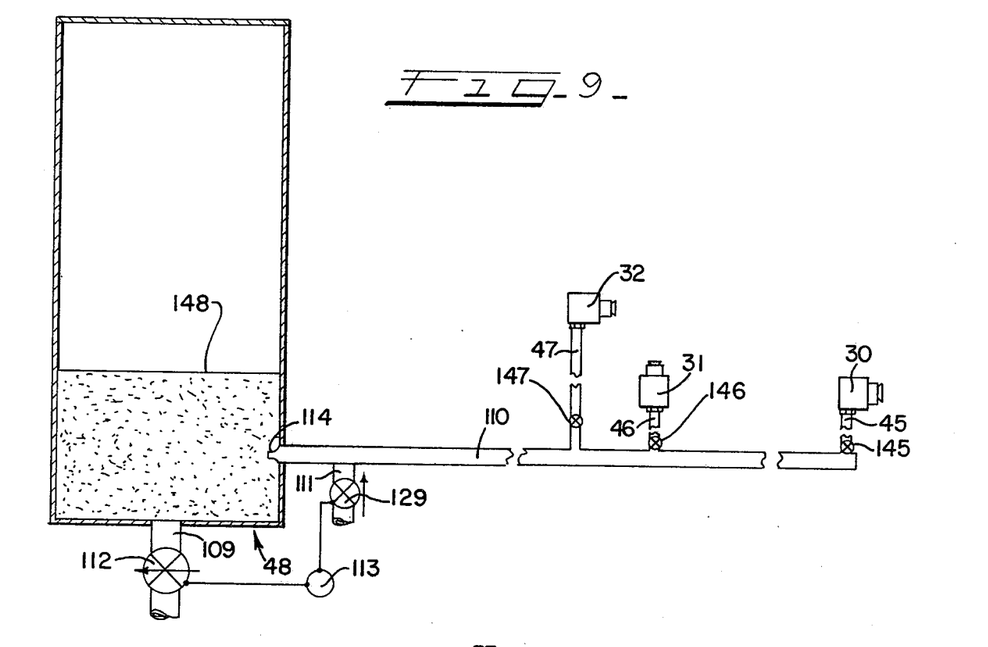
FIG. 9 is a schematic and diagrammatic layout of a purging arrangement for the spray deposition system.

The principal system components are the fluidizer 48, with air supply line 109, the main fluidized powder supply line or manifold 110, with purging air supply line 111, and the three spray units 30, 31 and 32, with their individual supply lines 45, 46 and 47 respectively.

In the prior practice of fluidized powder spraying, the fluidized condition of powder in the supply tank has been maintained, delivery to spray units being controlled on the discharge side of the fluidizer. For the purposes of this system, fluidization is intermittent, as determined by the opening or closing of an automatic valve 112 in the air inlet 109 to fluidizer 48. Valve 112 is under control of a suitable timer 113. At the beginning of spray deposition, valve 112 is open, admitting air under the appropriate pressure into fluidizer 48, forming a powder fog which is discharged at a meassured rate through the metering orifice 114, from which the fluidized powder flows through line 110 and thence to the guns 30, 31 and 32. The rates of powder delivery to the several guns are adjusted by the respective proportioning valves 145, 146, and 147.

The deposition time cycle is set in two stages, namely, deposition and purge. At the end of the deposition stage, fluidizing air inlet valve 112 closes on signal from timer control 113. Upon cut-off of fluidizing air, the powder in fluidizer 48 settles to the bottom of the tank, the quantity being maintained at minimum value such that the settled level 148 is substantially above the discharge orifice 114, which may be suitably shielded or screened to prevent sifting leakage.

After fluidization is terminated, the purging air is admitted through valve 129. Back flow to the fluidizer tank 48 is prevented by the powder above the opening, with a residual, tank pressure greater than that of the purging air. The purging air flows through lines 110, 45, 46 and 47 and through the units 30, 31 and 32, picking up and carrying trapped or fallout powder, which is then delivered to the mold, completing the full measure of spray deposition. When the timer 113 times out, the valve 129 closes, cutting off the purging air, whereupon the deposition assembly 28 (FIG. 3) is retracted.

POST HEATING FOR FINAL SINTERING

An oven temperature of 400°F. is suitable for final sintering of the article in mold 16, using the three-stage arrangement shown in FIG. 2. Oven 33 is a type suitable for maintaining an atmosphere at the desired temperature, throughout the heating zone. As shown with the apparatus of FIG. 2, oven 33 is an air-heated tunnel type, with open ends to permit free passage of molds 16, as they are brought through on table 17. By virtue of the molds continuously rotating on their axes as they pass through oven 33, even sinter and cure are obtained, and adverse affects of sag or thermal distortion are minimized.

In order to insure proper heating of the mold and uniform sintering of the cure of the article, oven 33 is equipped with a forced circulation system that will provide an atmosphere temperature around the mold as nearby uniform as possible, and a substantially uniform heat transfer rate from the oven atmosphere to the article. Mold 16 is rather deep so provision is made for positive circulation interiorly of the mold and article, minimizing the development of an unfavorable temperature gradient through the walls of the article, which may otherwise result by virtue of stagnant atmosphere interiorly of mold 16. A circulation system having the desired characteristics is shown schematically in FIG. 10.

Figure 10:
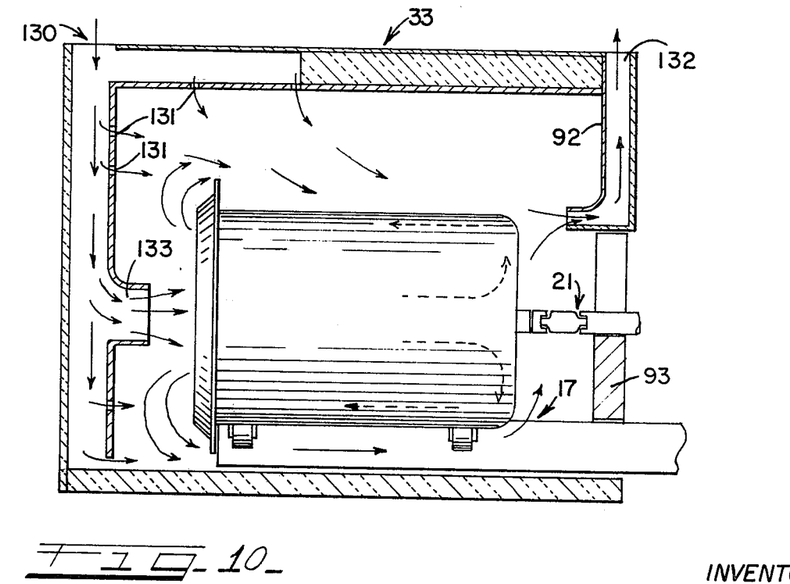
FIG. 10 is a schematic section on line 10—10 of FIG. 2, showing the oven air circulation system.

FIG. 10 is a section through oven 33 at station C of FIG. 2, the arrangement at stations D and E being the same. Oven 33 is provided with a hot air supply duct 130, receiving heated air from a suitable heating and air handling unit 34 (FIG. 2), and delivering air to the oven chamber generally from the outside and outer top wall section through a suitable arrangement of diffuser slots or louvers 131. Return or recirculation ducts 132 are provided generally along the inner or back walls of oven 33, establishing a circulation pattern generally from front (outside) to back (inside) along and about the mold 16. The continuous rotation of mold 16 minimizes adverse effects of blind spots or obstruction, such as may result from the structure of table 17, remoteness of some molded areas from the supply zone, such as bottom 20, and similar factors tending to produce uneven heating. It will be readily understood that uneven heating may result in uneven sintering and cure and consequent non-homogeneity and variations in the properties of the completed article.

The general supply and circulation system described tends to leave a somewhat stagnant atmosphere interiorly of mold 16, conducive to objectionable temperature conditions or gradients, particularly near bottom 20. In order substantially to preclude sintering imperfections due to the causes noted, particularly those which might result in areas along and near the bottom 20, provision is made for positive circulation interiorly of mold 16. Stagnancy interiorly of mold 16 and consequent adverse temperature conditions are obviated by providing a supply air discharge nozzle 133 directed toward the interior of molds 16, as shown in FIG. 10. The air stream enters the mold axially, at a relatively high velocity. As the initially high velocity is dissipated, the air flows along the mold bottom and wall and out through the oven chamber to return duct 132, as indicated by the circulation arrows.

Excessive heat loss and chill effects at the open oven ends can be avoided by air curtains, or similar supply and circulation arrangements, as with comparable heating tunnels or continuous kilns. However, here provision is made for passage of the drive 21, whereby to maintain a fully closed inner side wall of the oven, also to shield the motors 22 from the oven heat. Provision for this purpose is shown in FIG. 11, wherein 92 represents the oven's inner side wall, extending down to a plane a short distance above the plane of drive 21. The lower portion of oven 33 is closed by a separate wall section 93, supported on and affixed to the table 17. The rotary wall section 93 is structured for good heat insulation properties, not only to minimize heat dissipation from oven 33, but to preclude excessive heat buildup in section 93 and possible damage to motor 22 or the other apparatus on or around the table 17 as the latter rotarily carries wall sections 93. As best seen in FIG. 2, a plurality of such wall sections 93, of the same number as the number of molds 16, form a complete circle, so that as table 17 rotates, the entire length of the inner wall is at all times closed by three sections 93 complementing the fixed oven wall 92, FIG. 11. A flange 94 along the lower edge of fixed wall 92 may be provided with a rubbing seal 96 to close the gap between wall section 93 and fixed wall 92, or the small gap may simply be curtained. As shown in FIG. 4, slots 97 through or between wall sections 93 accommodate the drives 21, the relatively small infiltration or exfiltration which may occur due to such opening at each of three sinter stations being of negligible consequence.

The motors 22 and remote from oven 33 and shielded from radiant heat effects by the wall sections 93, and the particular mold assembly is exposed to oven conditions only intermittently for short periods. Accordingly, heat conduction along shaft 21 does not present a hazard to motors 22.

QUENCH COOLING AND STRIPPING

Figure 12:
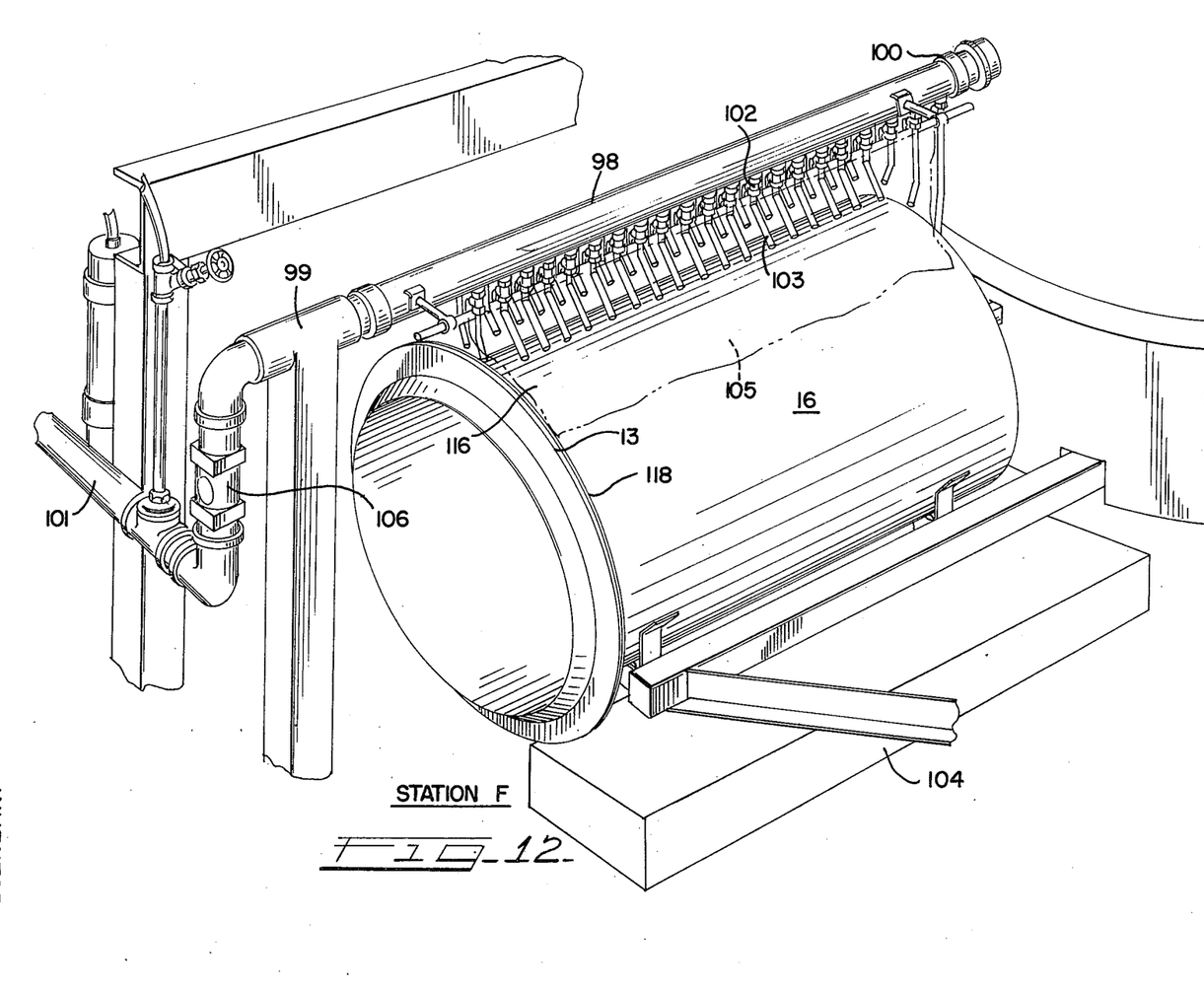
FIG. 12 is a perspective view of the cooling station, viewed generally inwardly of the table.

The apparatus at station F (FIG. 2) is shown in detail in FIG. 12. The function of this apparatus is to cool the mold and to set the article, preparatory to stripping. Manifold 98, supported on brackets 99 and 100, extends lengthwise of mold 16. The manifold 98 is supplied with cooling water from the inlet pipe 101. A number of closely spaced nozzles 102 are provided, being tubes with their discharge ends 103 bent to direct the discharge virtually tangential to the wall 116 of mold 16, in the direction of rotation of the mold 16, providing parallel-flow heat transfer conditions and maximum coolant contact time. The spent cooling water drops into a drain pan 104, from which the water may be piped to waste, or recirculated through a chiller, evaporative cooler, cooling tower, or the like. A cloth splash curtain 105, opposite the nozzle discharge, minimizes wastage of cooling effect, helping maintain the flow from the waterfall in intimate contact with the mold.

While the mold and article are being cooled as described, it is desirable to initiate stripping, which can conveniently be done by inserting a thin blade between the article chime 13 and the mold chime 118, while the mold rotates during the cooling cycle. This step provides a handhold for the operator at the succeeding station G, where the operator grasps the article along the freed chime portion 13 and pulls the article out of the mold, which does not rotate at station G, by virtue of a limit switch (not shown) deenergizing the corresponding motor 22. The article being quite flexible, there is no stripping difficulty because of moderate undercuts, as obtain in the sections such as the corrugations 14 (FIG. 1). However, it is preferable to treat the mold cavities with one of the release coatings commercially available for use on molds for plastic articles.

After the article has been stripped, mold 16 returns through idle station H to the beginning of the next molding cycle at station A, FIG. 2.

PRIMARY CONTROL SYSTEM

Figure 13:
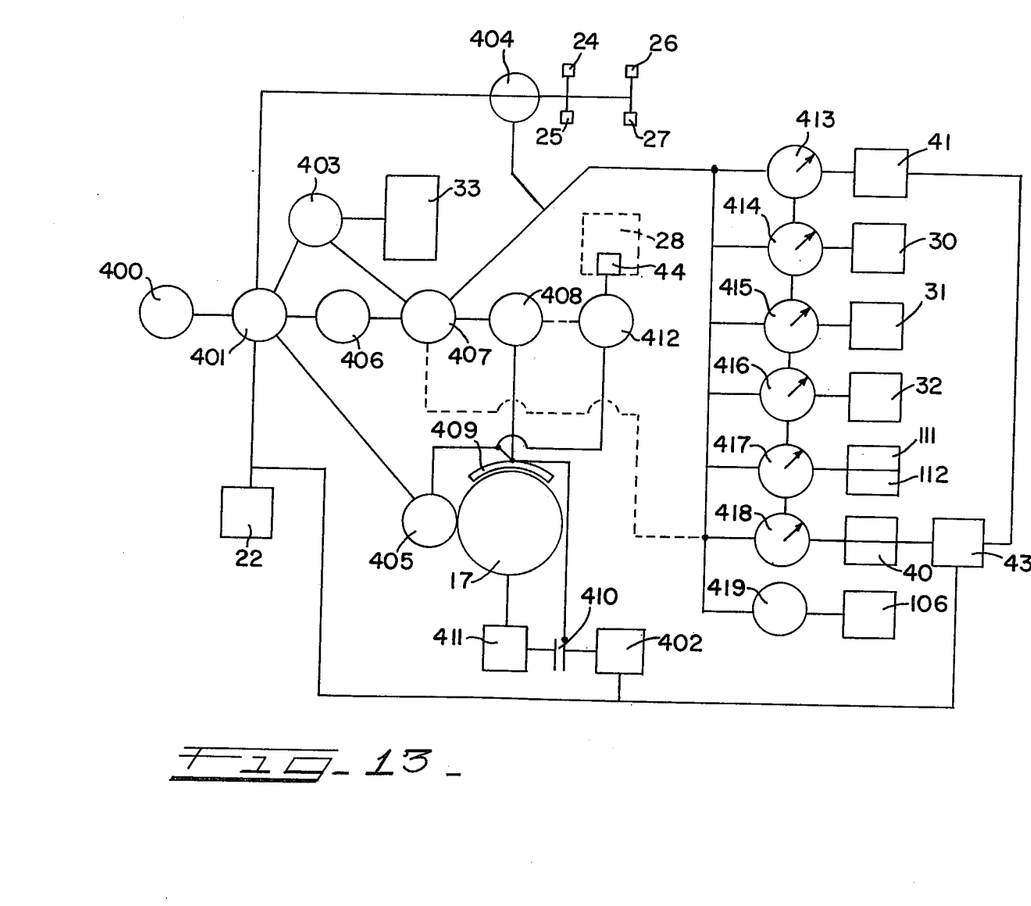
FIG. 13 is a block diagram showing the automatic control system for apparatus shown in FIG. 2.

FIG. 13 is a block diagram of a primary automatic control system for the apparatus shown in FIG. 2. Secondary, servo and safety controls and circuitry are not here shown, their detailing and application in such automatic control systems being well understood by those skilled in the controls arts.

Closing master switch 400 puts master control group 401 on line. Group 401 includes interlocked set switches for starting mold drive motors 22, table drive motor 402, and auger drive motor 43, and for activating oven controls 403 and burner controls 404, which at this stage respectively put oven 33 on low fire and ignite pilots for burners 24, 25, 26 and 27. The foregoing set switches of group 401 are also interlocked with a satisfaction switch responsive to the condition of table position switch 405, which is satisfied when table 17 is at the dwell position as shown in FIG. 2, with molds 16 on station. Obviously, other safety or condition satisfaction switches may be incorporated in group 401, as desired.

When all the set and satisfaction switches of group 401 are closed, actuation of pushbotton switch 406 starts master timer 407, which in selected timed sequence actuates controls 403 and 404 to bring oven 33 and burners 24–27 to high fire and actuates the table control 408. control 408 effects indexing traverse of table 17, by causing brake or drag 409 to release and clutch 410 to engage table drive 411 with motor 402. As table 17 nears its next dwell position, a signal from table position switch 405 first causes reverse actuation of drag 409 and clutch 410, stopping table 17 on station, and then actuates carriage drive control 412, energizing motor 44 to drive assembly 28 to its deposition station.

On feedback signal indicating that assembly 28 is at its deposition position, timer 407 starts the group of deposition station timers 413–418. Timer 417 control operation of roll 41, timers 414, 415, 416 control powder to units 30, 31, 32 respectively, and timer 418 controls auger 40, all as and for the purposes above described. Timer 47 controls fluidizing and purging air valves 111 and 112 (FIG. 9). An on-off control 419 governs operation of spray valve 106 (FIG. 12).

When the interlocked timers 413–418 have timed out, feedback signals effect resetting of timer 407, retraction of assembly 28 and closing of spray valve 106, restoring the apparatus and control system to cycle-start conditions, except that oven firing control 403 is cut out of timing control, after start-up, so that oven 33 continues on high fire.

MODIFICATIONS

The foregoing description presents the method in a preferred embodiment for fully automated production of an article such as drum liner 10 of FIG. 1. The turret or table arrangement above described is found economical of space, apparatus and controls, for the automatic production of articles in a range of relatively large sizes. However, smaller articles in particular can conveniently be produced with stations along a linear conveyor arranged for operation according to the teachings herein. More or fewer stations may be best adapted for articles of various sizes, configurations, or materials, according to the requirements in a particular case. For example, different materials can be laminated by providing two or more deposition stations in tandem, for deposition and presintering of the several materials in succession.

The extent of transfer apparatus and degree of automation desirable will obviously vary with quantity requirements. For low volume production, the invention can be implemented with a single mold or form the associated equipment being grouped and operations performed at a single location, in lieu of the plural-mold, transfer arrangement preferred for high volume production.

Those skilled in the art will perceive other variations and modifications in the method described, within the spirit and scope of the invention, whereby the same may be adapted to articles of various types and sizes, for various production rates with various control arrangements, more or less automated, according to the requirements of the particular application. It will also be understood that the invention is not limited to practice with the open mold as above described, but that the invention is adaptable for use with other types of molds, forms, templates, or for molding or lining in situ, according to the nature and configuration of the article to be produced. The invention is not limited to the preferred embodiment herein described, the scope of the invention being defined by the appended claims.

What is claimed is:

1. In a method of molding a plastic liner from communited plastics material, said liner having a generally tubular side wall and a bottom, an improvement comprising the steps of:
   a. providing a mold, having a horizontal axis, and having a cavity defined by a side wall and an end wall generally corresponding to the shape of said liner;
   b. heating said mold to a temperature suitable for fusing said material when deposited thereon;
   c. rotating said mold about said horizontal axis; and
   d. directing a predetermined position and limited width first stream of said material downwardly generally on opposite sides of a vertical plane passing through said horizontal axis for impinging on the cavity side wall along an axially extending strip thereof simultaneously along the full length of said cavity side wall, and simultaneously directing a second stream of said material under pressure substantially horizontally so as to impinge on said end wall of said cavity while maintaining said temperature and rotating said mold to progressively assimilate and fuse said material in the form of said liner.

2. A method of molding a plastic liner as defined in claim 1 wherein said material is polyethylene, said temperature being approximately 400°F.

3. A method of molding a plastic liner as defined in claim 1, including directing said second stream for effecting impingement of the material in said second stream on the end wall of said cavity throughout a zone including the center of said cavity end wall and a portion of said cavity side wall adjacent said cavity end wall for simultaneously building up and blending said liner side wall and said liner bottom.

4. A method of molding a plastic liner as defined in claim 3 further including electrostatically charging said second stream for establishing a potential difference between said material in said second stream and said mold urging said second stream against said mold bottom.

5. The method of claim 1 wherein at least a portion of said first stream is mechanically impelled towards the cavity side wall.

6. The method of claim 1 wherein at least a portion of said first stream is free falling towards the cavity side wall.

7. The method of claim 1 wherein at least a portion of said first stream is mechanically impelled towards the cavity, and at least a portion of said first stream is free falling towards the cavity side wall.

8. The method of claim 1 wherein the axially extending strip is restricted to that portion of the cavity side wall which is lowermost with respect to the remainder of the cavity side wall.

* * * * *